Figure 1:
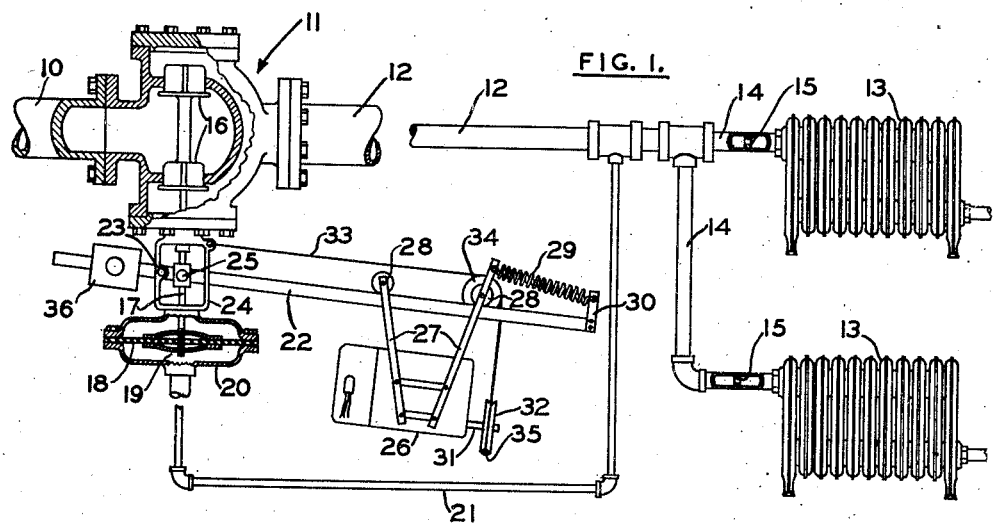

Dec. 13, 1938.  J. TURNER  2,140,486
REMOTE CONTROL FOR FLUID FLOW CONTROL SYSTEMS
Filed Aug. 10, 1933  2 Sheets-Sheet 1

Inventor
JOHN TURNER
By George H. Fisher
Attorney

Dec. 13, 1938.                J. TURNER                 2,140,486
           REMOTE CONTROL FOR FLUID FLOW CONTROL SYSTEMS
               Filed Aug. 10, 1933        2 Sheets-Sheet 2

Inventor
JOHN TURNER

By George H. Fisher
                Attorney

Patented Dec. 13, 1938

2,140,486

UNITED STATES PATENT OFFICE 2,140,486

REMOTE CONTROL FOR FLUID FLOW CONTROL SYSTEMS

John Turner, Boston, Mass., assignor to Minneapolis-Honeywell Regulator Company, Minneapolis, Minn., a corporation of Delaware Application August 10, 1933, Serial No. 684,531

14 Claims. (Cl. 236—91)

The present invention relates to an improved remote control system which has specific utility in controlling the flow of fluids, the improved system being particularly adaptable to the control of the flow of steam to one or more steam radiators such as are commonly utilized for heating purposes.

One of the objects of the invention is the provision of an improved remote control system by which an instrumentality may be positioned in accordance with two or more conditions and by which the flow of fluid through a fluid supply line may be automatically varied in accordance with the movements of a remotely located movable member. The movable member may be actuated by or respond to any desired condition or function and, in the specific embodiments of the invention to be hereinafter described, the movable member responds to changes in temperature.

A further object of the invention is the provision of a control system by which the flow of a fluid is normally varied in accordance with the movements of a movable member and is additionally controlled so as to give a predetermined flow during certain periods of time irrespective of the position of the movable member. When the flow of steam to one or more radiators is controlled by this system, the movable member preferably responds to changes in the outdoor temperatures and, in such a case, it is preferably desired to additionally utilize two other movable members which respond to changes in the temperature of the space to be heated. One of these additional movable members operates to increase the flow of steam to the radiator or radiators if the temperature of the space to be heated is not maintained sufficiently high by the primary movable member. The other additional movable member operates to increase the supply of steam to the radiator or radiators if the temperature of the space to be heated falls below a predetermined value during those times at which a constant reduced supply of steam is being furnished to the radiator or radiators under the command of the timing mechanism.

Specifically, when this system of control is applied to control the flow of steam to one or more radiators, an outdoor thermostat modulates or proportions the flow of steam to the radiator or radiators in accordance with changes in outdoor temperatures. One of two space temperature responsive thermostats renders the outdoor thermostat inoperative if the space temperature should fall below a predetermined value and operates to give a full supply of steam to the radiator or radiators until the space temperature is restored. A timing mechanism operates at night to reduce the flow of steam to a predetermined minimum value and a second space responsive thermostat operates during the night to supply an intermediate flow of steam if the temperature of the space should drop below a predetermined safe value which is lower than the daytime allowable minimum temperature.

A further object of the invention is the provision of improved mechanisms for adjusting the settings of various types of pressure regulators whereby varying fluid flows may be maintained in accordance with the movement of a remotely located movable member.

One of the more specific objects of the invention is the adjusting of a diaphragm type pressure regulator which includes an arm for changing the setting of the pressure regulator, by automatically shifting a weight along the arm of the pressure regulator in accordance with the movements of a movable member. Preferably, the movable weight takes the form of a motor mechanism which is normally biased to assume a position near one end of the arm and which may be operated by the movement of a remotely located movable member to travel toward the other end of the arm against its bias whereby to vary the setting of the pressure regulator.

Another of the more specific objects of the invention is the adjustment of a diaphragm type pressure regulator by varying the pressure supplied to the diaphragm in accordance with changes in some condition, such as changes in outdoor temperature.

Other objects of the invention reside in the various systems as a whole, in an improved means for operating a motor mechanism from a remote point, in the various manners of adjusting pressure regulators and in the various sub-combinations embodied in the complete systems.

Further objects of the invention will become apparent as the description thereof proceeds.

Figure 2:
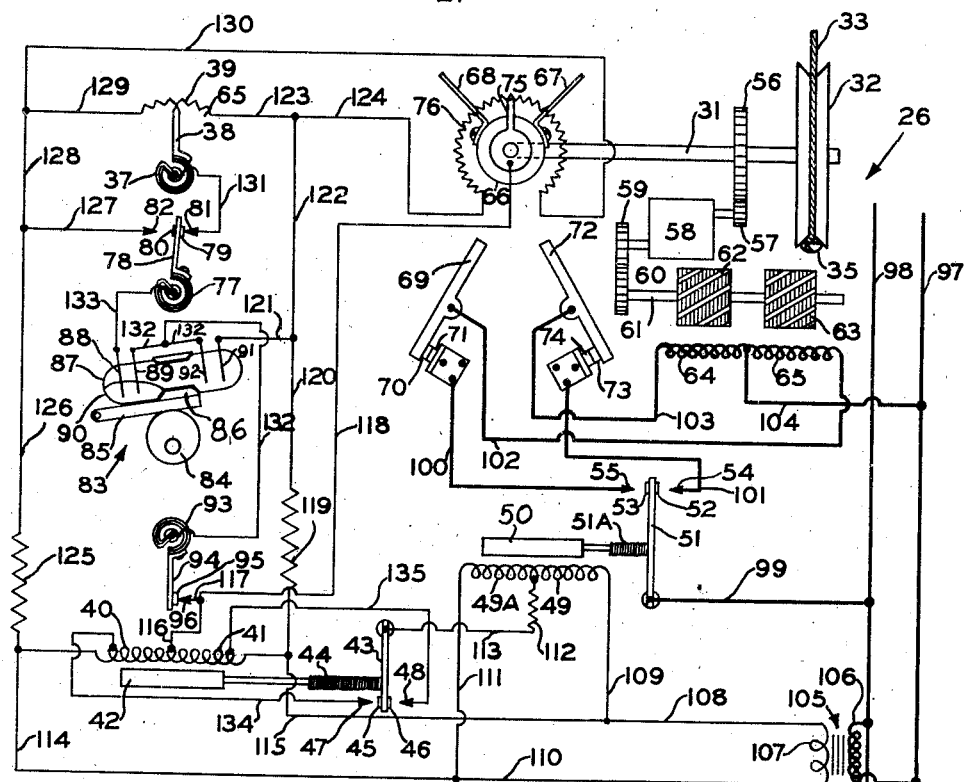
Figure 3:
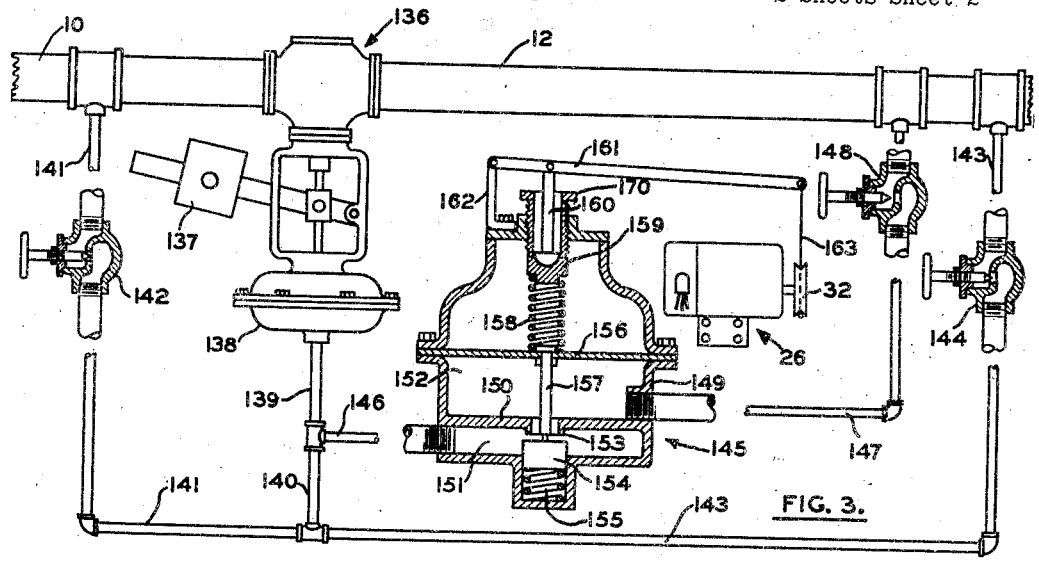
Figure 4:
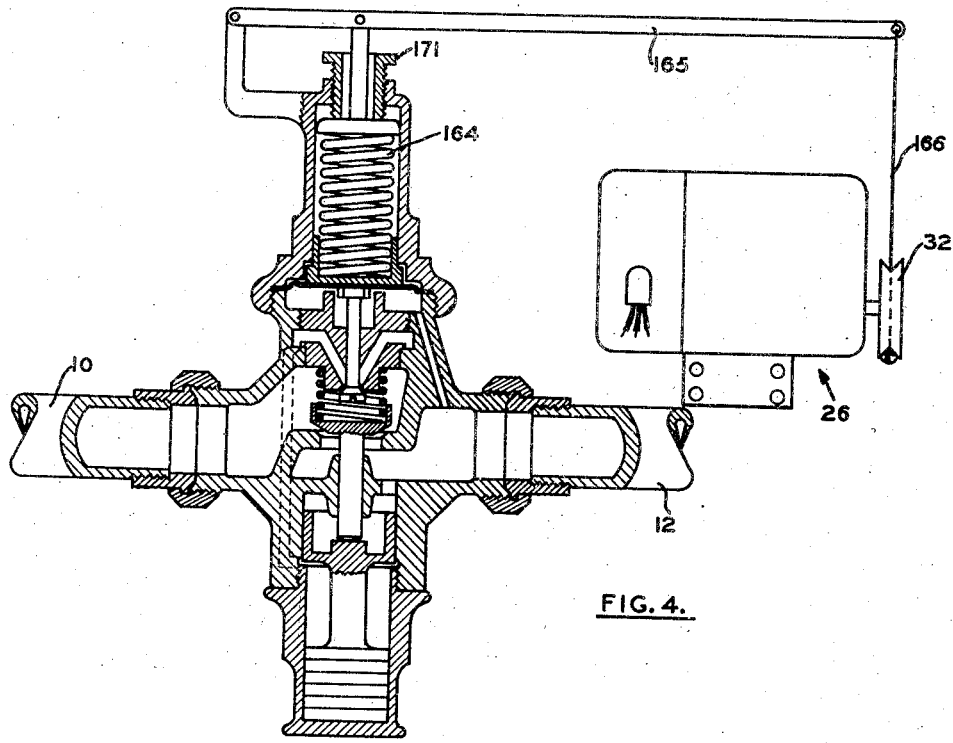

For a more complete understanding of the invention, reference may be had to the following description and accompanying drawings, in which;

Fig. 1 is a schematic view of the preferred form of the invention, the controls and wiring being omitted, Fig. 2 is a schematic view of the control system and wiring diagram thereof for controlling the apparatus of Fig. 1, Fig. 3 is a view of a modified form of the invention, omitting the controls therefor, and Fig. 4 is a schematic showing of a further modification of the invention.

Referring first to Fig. 1, a steam supply main is indicated at 10. Steam supplied to the main 10 may be obtained from an individual boiler or from a central station or in any other desired or usual manner. A pressure regulator, generally indicated at 11, allows the steam in main 10 to enter a header 12 under reduced pressure. The header 12 supplies steam to radiators 13 through risers 14 and each radiator 13 is provided with an individual regulating orifice indicated at 15 whereby the proper amount of steam may flow to each and every radiator.

A pressure regulator 11 includes balanced valves 16 controlled by a stem 17 which has one of its ends secured to a diaphragm 18 as indicated at 19. The diaphragm 18 constitutes one wall of a chamber the other wall of which is defined by a casting 20. A bleed-line 21 communicates with header 12 and with the chamber defined by casting 20 and diaphragm 18 in such a manner that the reduced pressure present in header 12 tends to lift diaphragm 18 and move the balnced valves 16 to closed position. An arm 22 pivoted at 23 to the frame 24 of the pressure regulator 11 is secured to valve stem 17 as indicated at 25. A motor mechanism 26 is provided with a frame 27 which carries pulleys 28 which in turn rest upon the arm 22 with the result that the motor mechanism 26 is adapted to move back and forth along arm 22. A coiled spring 29 has one of its ends secured to a bracket 30 carried by arm 22 and its other end is secured to frame 27 so that the motor mechanism 26 is biased to assume a position at the extreme right-hand end of arm 22. The motor mechanism 26 includes a shaft 31 which carries a pulley 32. A cable 33 has one of its ends secured to the frame 24 of pressure regulator 11, passes over a pulley 34 pivoted on frame 27, and has its other end secured to pulley 32 as indicated at 35. A counterweight 36 is adjustably secured to the left hand end of arm 22 and serves to partially compensate for the weight of motor mechanism 26. The weight of motor mechanism 26 tends to move valve stem 17 and diaphragm 18 in a downward direction in opposition to the pressure operating on the under side of diaphragm 18 and by shifting motor mechanism 26 along arm 22 the reduced pressure which the pressure regulator 11 will maintain in the header 12 may be adjusted in the usual and well-known manner.

With the parts in the position shown in Fig. 1, the balanced valves 16 are partially open allowing an intermediate pressure in header 12 and an intermediate flow of steam to the radiators 13. If the shaft 31 is rotated in a counter-clockwise direction as viewed from the right in Fig. 1, the pulley 32 will wind up more of cable 33 resulting in movement of motor mechanism 26 to the left along arm 22 against the bias of spring 29. In this manner, the weight acting in opposition to the pressure underneath diaphragm 18 is reduced with the result that the valves 16 move to a more nearly closed position thereby reducing the pressure in header 12 and the flow of steam to radiators 13. If, on the other hand, the shaft 31 is rotated in a clockwise direction, part of the cable 33 will be unwound allowing spring 29 to move motor mechanism 26 along arm 22 towards the right hand end thereof. This action will create a greater force in opposition to the pressure operating on the under side of diaphragm 18 with the result that valves 16 will open more widely thereby creating a greater pressure in header 12 and allowing a larger flow of steam to the radiators 13.

Turning now to Fig. 2, the control arrangement by which motor mechanism 26 is moved back and forth along arm 22 by reason of reverse rotation of shaft 31 is disclosed. A temperature responsive element 37, herein shown as the well-known bimetallic volute, controls a movable member 38 which moves back and forth along a resistance 39 in response to temperature changes. The thermostatic element 37 is preferably placed out-of-doors so as to respond to outside temperatures. The movable member 38 and control resistance 39 constitute a control potentiometer.

A normally balanced electrically controlled means is herein shown as comprising a solenoid winding having a center tap so as to provide a first solenoid winding 40 and a second solenoid winding 41. Solenoid windings 40 and 41 control a plunger 42 which is connected to a flexible switch arm 43 through a coiled spring 44. Flexible switch arm 43 carries contacts 45 and 46 which are adapted to engage relatively stationary contacts 47 and 48.

A relay comprises a second center-tapped solenoid coil by which relay winding 49A and 49 are provided. These relay windings control a plunger 50 which is connected to a flexible relay switch arm 51 by means of a coiled spring 51A. Flexible switch arm 51 carries contacts 52 and 53 which are adapted to respectively engage stationary contacts 54 and 55.

The shaft 31 carries a gear 56 which meshes with a pinion 57 of a gear reduction 58 having a gear 59 which meshes with a pinion 60 secured to a rotor shaft 61. Rotor shaft 61 carries motor rotors 62 and 63 which are provided with field windings 64 and 65 respectively. When field winding 65 is energized, shaft 31 is slowly rotated in a clockwise direction, as viewed from the right in Fig. 2, and in a similar manner, when field winding 64 is energized, shaft 31 is rotated in a counter-clockwise direction. The two motors comprised by rotors 62 and 63 and field windings 64 and 65 act therefore to drive shaft 31 in reverse directions and could well be replaced by any of the well-known types of reversible motors. Secured to shaft 31 is a drum 66 which carries a pair of adjustable limit switch actuators 67 and 68. Upon clockwise rotation of shaft 31, looking from the right, limit switch actuator 68 is adapted to engage a pivoted limit switch arm 69 and move the contact 70 carried thereby out of engagement with a stationary contact 71. Similarly, upon counter-clockwise rotation of shaft 31, limit switch actuator 67 is adapted to engage a pivoted limit switch arm 72 and move the contact 73 carried thereby out of engagement with a stationary contact 74. Shaft 31 also carries a balancing contact finger 75 which, upon reverse rotation of shaft 31, sweeps back and forth along a balancing resistance 76. Balancing resistance 76 and balancing contact finger 75 constitute a balancing potentiometer.

A second thermostatic element 77, herein likewise shown as a bimetallic volute, controls a movable member 78 which is provided with a pair of contacts 79 and 80 which are adapted to respectively engage stationary contacts 81 and 82. Thermostatic element 77 responds to the temperature of the space to be heated and when the temperature of the space is sufficiently high during the day-time, as will be hereinafter explained, contacts 79 and 81 are in engagement. If the temperature of the space to be heated should fall below the desired temperature during the day, contacts 79 and 81 will be separated and contact 80 will move into engagement with contact 82. These pairs of contacts are so arranged that one or the other is always closed and in actual practice this thermostatic switch may take the form of a double-ended mercury switch.

A time switch mechanism, generally indicated at 83, comprises a cam 84 which is rotated by timing means (not shown) the cam 84 being adapted to lower and raise a pivoted carrier 85 at predetermined times of day, the lowering operation preferably taking place in the evening and the rising operation taking place in the morning. Pivoted carrier 85 supports a mercury switch clip 86 in which is fastened a double-ended mercury switch 87. Electrodes 88 and 89 are carried near the left hand end of mercury switch 87 and are adapted to be bridged by a body of mercury 90 when the carrier 85 is in its elevated position. A similar pair of electrodes 91 and 92 carried near the right hand end of mercury switch 87 are adapted to be bridged by the body of mercury 90 when the carrier 85 is lowered.

A third thermostatic element 93, also herein shown as a bimetallic volute, controls a movable member 94 which carries a contact 95 that co-operates with a stationary contact 96. Thermostatic element 93 also responds to the temperature of the space to be heated and, if the temperature of the space should fall below a predetermined value which is lower than the value at which contact 79 disengages contact 81 and contact 80 engages contact 82, then contact 95 will disengage contact 96.

Electrical power is supplied to the control system of Fig. 2 by means of high voltage line wires 97 and 98. A wire 99 connects relay switch arm 51 with line 98. Wires 100 and 101 respectively connect stationary contacts 55 and 54 with limit contacts 71 and 74. Wire 102 connects limit switch arm 69 with one end of field winding 65 and in a similar manner wire 103 connects limit switch arm 72 with one end of field winding 64. The other ends of field windings 64 and 65 are connected to line 97 by a wire 104.

A step-down transformer 105 has its high voltage primary 106 connected to line wires 97 and 98. One side of low voltage secondary 107 of transformer 105 is connected to one end of relay coil 49 by wires 108 and 109. The other side of secondary 107 is connected to one end of relay winding 49A by wires 110 and 111. The junction or center-tap of relay windings 49A and 49 is connected to flexible switch arm 43 by a protective resistance 112 and a wire 113. One end of solenoid winding 40 is connected to one side of secondary 107 by wires 114 and 110 and one end of solenoid winding 41 is connected to the other side of secondary 107 by wires 115 and 108. The junction of solenoid windings 40 and 41, contact 96, and balanced contact finger 75 are connected by wires 116, 117 and 118. The outer end of solenoid winding 41 is connected to electrode 91, the right hand end of control resistance 39, and the left hand end of balancing resistance 76 through a protective resistance 119 by means of wires 120, 121, 122, 123 and 124. In a similar manner, the outer end of solenoid winding 40 is connected to contact 82, the left hand end of control resistance 39, and the right hand end of balancing resistance 76 through a protective resistance 125 by means of wires 126, 127, 128, 129 and 130. Movable member 38 is connected to contact 81 by a wire 131 and movable member 94 is connected to electrodes 89 and 92 by wire 132. Movable member 78 is connected to electrode 88 by a wire 133. A wire 134 connects contact 47 with a small number of turns of solenoid winding 40 and likewise a wire 135 connects contact 48 with a small number of turns of solenoid winding 41.

With the parts in the position shown in Figs. 1 and 2, solenoid windings 40 and 41 are equally energized, movable member 38 is contacting the center of control resitance 39 indicating that the outdoor temperature is moderate, and balancing contact finger 75 is contacting the center portion of balancing resistance 76. Contacts 45 and 46 are out of engagement with their respective contacts 47 and 48 with the result that relay windings 49A and 49 are equally energized by the following circuit: secondary 107, wire 108, wire 109, relay windings 49 and 49A, wire 111 and wire 110 to the other side of secondary 107. Relay contacts 52 and 53 are therefore out of engagement with their respective stationary contacts 54 and 55 and both field windings 64 and 65 are deenergized. Motor mechanism 26 is approximately midway-way between its allowable limits of travel along arm 22 with the result that the valves 16 are in an intermediate position. The apparatus is operating on the day-time cycle since electrodes 88 and 89 are bridged by the body of mercury 90. The temperature of the space is at or above the desired temperature as is indicated by contact 79 being in engagement with contact 81. Contact 95 is therefore in engagement with contact 96 since these contacts are set to open at a lower temperature than that at which contacts 79 and 81 open.

If the outdoor temperature should fall, movable member 38 will travel along control resistance 39 towards the left hand end thereof. This action decreases the voltage drop across solenoid winding 40 and increases the voltage drop across solenoid winding 41 whereupon plunger 42 moves to the right. Flexible switch arm 43 is thereby flexed to the right bringing contact 46 into engagement with contact 48. Engagement of contacts 46 and 48 complete a circuit as follows: from secondary 107 through wires 110 and 111 through relay winding 49A after which the circuit splits, one part going through relay winding 49 and back to the other side of secondary 107 through wires 109 and 108 while the other portion goes through protective resistance 112, wire 113, flexible switch arm 43, contacts 46 and 48, wire 135, a small number of turns of solenoid winding 41 and wires 115 and 108 to the same side of secondary 107. Engagement of contacts 46 and 48 therefore decreases the current flow through relay winding 49 and increases the current flow through relay winding 49a whereupon plunger 50 moves to the left, causing contact 53 to engage contact 55. The branch circuit through protective resistance 112 and the small number of turns of solenoid winding 41 attempts to additionally move plunger 42 to the right, resulting in an increased contact pressure between contacts 46 and 48. Engagement of contacts 53 and 55 completes an energizing circuit for field winding 65 as follows: line 98, wire 99, relay switch arm 51, contacts 53 and 55, wire 100, limit switch contacts 71 and 70, wire 102, field winding 65 and wire 104 to line 97. Energization of field winding 65 rotates rotor 63 in such a direction that shaft 31 is rotated in a clockwise direction as viewed from the right in Figs. 1 and 2. This clockwise rotation of shaft 31 will continue until balancing contact finger 75 has traveled along balancing resistance 76 to such a point that the voltage drops across solenoid windings 40 and 41 are again substantially equalized so that plunger 42 returns to its center position and disengages contact 46 from contact 48. Such disengagement of contacts 46 from contact 48 equalizes the current flows through relay windings 49A and 49 whereupon plunger 50 moves to its central position and disengages contact 53 from contact 55 to deenergize field winding 65 and prevent further rotation of shaft 31. This clockwise rotation of shaft 31 also operates to unwind some of cable 33, thereby allowing spring 29 to move motor mechanism 26 along arm 22 towards the right hand end thereof. This shifting of motor mechanism 26 increases the force which must be balanced by the pressure under diaphragm 18 with the result that valves 16 open more widely and a higher pressure is thereby maintained in header 12 resulting in a larger flow of steam to the radiators 13. In this manner, more heat is furnished to the space to be heated upon a fall in the outdoor temperature. If the outdoor temperature should fall to approximately 0° (it may be desirable to vary this value for different localities and for different orifices 15) the movable member 38 will move to the extreme left hand end of control resistance 39 and shaft 31 will rotate in a clockwise direction until balancing contact finger 75 has rotated along control resistance 76 to again substantially rebalance the voltage drops across solenoid windings 40 and 41. The limit switch actuator 68 may be adjusted to operate limit switch arm 69 to disengage contact 70 from contact 71 after varying amounts of rotation of shaft 31, whereby the extreme right hand movement of motor mechanism 26 along arm 22 may be adjusted. This adjustment predetermines the maximum flow of steam to the radiators 13.

In a similar manner, a rise in outdoor temperature results in movement of movable member 38 along control resistance 39 towards the right hand end thereof. Whenever such a movement of movable member 38 occurs, the voltage drop across solenoid winding 40 will be increased and the voltage drop across solenoid winding 41 will be decreased resulting in movement of plunger 42 towards the left and engagement of contact 45 with contact 47. Engagement of contact 45 with contact 47 unbalances the current flows through relay windings 49A and 49 by the completion of the following series parallel circuit: from secondary 107 through relay winding 49 by means of wires 108 and 109, at which point the circuit splits, one part thereof traversing relay winding 49A and returning to the other side of secondary 107 by wires 111 and 110 whereas the other part goes through protective resistance 112, wire 113, flexible switch arm 43, contacts 45 and 47, wire 134, a small number of turns of solenoid winding 40 and to the same side of secondary 107 by means of wires 114 and 110. Plunger 50 therefore moves to the right causing engagement of contacts 52 and 54. Likewise plunger 42 attempts to move further to the left by reason of the additional energization of the small number of turns of solenoid coil 40 whereby the contact pressure between contacts 45 and 47 is increased. Engagement of contacts 52 and 54 establishes an energizing circuit for field winding 64 which circuit is as follows: line 96, wire 99, relay switch arm 51, contacts 52 and 54, wire 101, limit switch contacts 74 and 73, wire 103, field winding 64, and wire 104 to line 97. Motor rotor 62 is thereupon rotated in such a direction that shaft 31 rotates in counter-clockwise direction, as viewed from the right in Figs. 1 and 2, resulting in movement of balancing contact finger 75 along balancing resistance 76 until the voltage drops across solenoid windings 40 and 41 are again substantially rebalanced whereupon field winding 64 is deenergized in a manner similar to that set forth in connection with the deenergization of field winding 65. This counter-clockwise rotation of shaft 31 likewise winds up part of cable 33 on pulley 32 whereupon motor mechanism 26 moves along arm 22 towards the left end thereof, against the bias of spring 29. This shifting of motor mechanism 26 reduces the force operating against the pressure under diaphragm 18, whereupon valves 16 will be partially closed and the pressure in header 12 and the flow of steam to radiators 13 will be reduced. Extreme left hand movement of motor mechanism 26 along arm 22 is accomplished when movable member 38 engages the extreme right hand end of control resistance 39 but, as heretofore explained in connection with right hand movement of motor mechanism 26, this extreme motion may also be predetermined by adjusting the limit switch actuator 67 so as to cause opening of limit contacts 73 and 74 when shaft 31 has rotated a predetermined amount in counter-clockwise direction.

The spring connections 44 and 51A help to eliminate contact chatter due to alternating current vibration of plungers 42 and 50 and also provide a sort of universal connection by which the straight-line motion of plungers 42 and 50 may be readily transmitted to flexible switch arm 43 and relay switch arm 51. Protective resistances 119 and 125 prevent the complete short-circuiting of transformer 107 when movable member 38 and balancing contact finger 75 reach the extreme ends of their associated resistances 37 and 76. In a somewhat similar manner, the protective resistance 112 limits the total current flow through relay windings 49A and 49 during those periods when the current flow through these relay windings is unbalanced. These are practical commercial features which are necessary for a commercially practicable system.

From the foregoing description, it will be seen that the pressure in header 12 and therefore the steam flow to radiators 13 is modulated or proportioned in accordance with variations in outdoor temperature. The change in outdoor temperature necessary to proportion the steam pressure and flow from minimum to maximum must necessarily be varied for different localities and in the present embodiment of the invention, this outdoor temperature change is from 0° F. for maximum steam pressure to 65° F. for minimum pressure.

The above described operation is the normal day-time operation of the system. However, if the steam supplied to radiators 13 should be insufficient to maintain the desired room temperature, movable member 78 which is operated by thermostatic element 77 will move contact 80 into engagement with contact 82 and will disengage contact 79 from contact 81. Solenoid winding 40 will thereupon be substantially completely short-circuited (the short circuiting of this solenoid coil would be complete if it were not for the inclusion of protective resistance 125) by the following circuit: solenoid winding 40, protective resistance 125, wires 126 and 127, contacts 82 and 80, wire 133, electrode 88, mercury 90, electrode 89, wire 132, contacts 95 and 96, and wires 117 and 116 to the other end of solenoid winding 40. This results in movement of plunger 42 to the right and engagement of contact 46 with contact 48. Motor mechanism 26 will thereupon be moved along arm 22 to its extreme right hand position, thereby allowing a maximum flow of steam to be delivered to radiators 13. This operation is an auxiliary function by which an extra amount of steam may be furnished to the radiators 13 if the proportioned flow of steam should not be quite sufficient to maintain the desired space temperature.

A predetermined time in the evening, cam 84 will reach such a position as to allow pivoted carrier 85 to move downwardly sufficiently for the body of mercury 90 to move to the right hand end of mercury switch 87. This movement of the body of mercury 90 breaks the circuit between electrodes 88 and 89 and completes the circuit between electrodes 91 and 92. Breaking of the circuit between electrodes 88 and 89 electrically disconnects movable member 39 with the result that control resistance 39 is connected directly in parallel with solenoid windings 40 and 41 and movements of movable member 38 along control resistance 39 are incapable of changing the voltage drops across solenoid windings 40 and 41. Solenoid winding 41 is now substantially completely short-circuited by a circuit from solenoid 41 through protective resistance 119, wires 120 and 121, electrodes 91 and 92, wire 132, movable member 94, contacts 95 and 96 and wires 117 and 116 to the other end of solenoid winding 41. Plunger 42 thereupon moves to the left causing engagement of contact 45 with contact 47 and motor mechanism 26 will move along arm 22 to the left to its extreme position thereby resulting in a minimum flow of steam to the radiators 13 during the night. Balancing contact finger 75 has likewise been moved along balancing resistance 76 substantially to the right hand end thereof, the exact position depending upon the setting of limit switch actuator 97. The space temperature will, of course, become lower due to the reduced supply of steam to radiators 13. When the space temperature falls below the value desired during the day, contact 80 will engage contact 82 but since the circuit between electrodes 87 and 88 has been broken such movement of movable member 78 will have no effect. If the space temperature, during the night cycle, should fall below some safe value, for example 40° F., thermostatic element 93 will move movable member 94 to disengage contact 95 from contact 96 whereupon the substantial short-circuit for solenoid coil 41 will be removed. Since balanced contact finger 75 has been moved near the right hand end of balancing resistances 76, the voltage drop across solenoid winding 41 is increased and the voltage drop across solenoid winding 40 is decreased upon separation of contacts 95 and 96. Contacts 46 and 48 will thereupon be engaged and shaft 31 will be turned in a clockwise direction as viewed from the right in Figs. 1 and 2, until balancing contact finger 75 is returned to the central position shown in Fig. 2, whereupon the voltage drops across solenoid windings 40 and 41 will be substantially rebalanced to cause disengagement of contacts 46 and 48 whereupon further clockwise rotation of shaft 31 ceases. This movement of shaft 31 moves motor mechanism 26 to the intermediate position shown in Fig. 1 wherein valves 16 are in an intermediate position and there is an intermediate flow of steam supplied to radiators 13 to raise the temperature of the space. In this manner, during the night cycle, the movable member 94 controlled by thermostatic element 93 prevents dropping of the space temperature below a safe value.

From the foregoing description, it will be apparent that during the day-cycle, this system proportions or modulates the supply of steam to the radiators in the space to be heated and, in addition, if the space temperature should fall below the desired value, the supply of steam is increased and in the specific example herein shown, the supply of steam is increased to a maximum. During the night-cycle, the supply of steam is reduced to a predetermined minimum but, if the temperature of the space should fall below a safe value, the supply of steam is again automatically increased and in the present embodiment of the invention, the supply of steam is increased to an intermediate value.

While this embodiment of the invention has been described in connection with regulating the flow of steam to radiators in a space to be heated, it will be readily apparent that the control system of Fig. 2 may be utilized in many other manners and that the movable members 38, 78 and 94 may respond to temperatures other than the outdoor temperature and space temperature or they may respond to any other conditions or functions by the changes of which it is desired to operate an instrumentality such as the valves 16.

Turning now to Fig. 3 of the drawings, a modified system of control is shown which has particular utility for controlling the flow of fluid when the supply of fluid is maintained at a quite constant pressure. As in the case of Figs. 1 and 2, the system of Fig. 3 will be explained in connection with controlling the flow of steam to radiators for heating purposes. The supply-main is indicated at 10, and as above brought out, is preferably connected to a source of constant steam supply such as that available from a central power station. The supply-main 10 communicates with a diaphragm type pressure regulator, generally indicated at 136, and the steam thereafter flows into a header 12 which in turn supplies one or more radiators 13 (not shown).

The diaphragm type pressure regulator 136 is of well known construction and may take the form shown in Fig. 1. When pressure is applied under the diaphragm of pressure regulator 136 to close the valves therein, this pressure is opposed by an adjustable weight 137. In Fig. 3, the adjustable weight 137 is not automatically positioned but instead mechanism is provided for varying the pressure supplied to the diaphragm of the pressure regulator. The diaphragm chamber 138 of pressure regulator 136 communicates with the supply main 10 by means of pipes 138, 140 and 141, there being a manually adjustable throttle valve 142 placed in a pipe 141. Similarly, the header 12 communicates with the diaphragm chamber 138 by means of pipes 139, 140 and 143, there being a manually adjustable throttle valve 144 located in pipe 143. The throttle valve 144 is adjusted to allow a small constant flow of steam from the diaphragm chamber 138 and the throttle valve 142 is adjusted to allow a small flow of steam into the diaphragm chamber 138 with the result that there is always pressure present in the diaphragm chamber 138. The pressure maintained in header 12 and the steam flow allowed therein is varied by bleeding a variable amount of steam from the diaphragm chamber 138. This bleeding is accomplished by means of a pilot pressure regulator generally indicated at 145 which communicates with diaphragm chamber 138 by pipes 139 and 146 and communicates with header 12 by a pipe 147 which contains a manually adjustable throttle valve 148 that is always wide open.

The pilot pressure regulator 145 comprises a casing 149 having a partition 150 forming an inlet chamber 151 and a combined outlet and diaphragm chamber 152. The partition 150 is provided with an opening defined by a valve seat 153 upon which a valve 154 is adapted to seat. The valve 154 is normally biased to its seated or closed position by a spring 155. A diaphragm 156 constitutes the upper wall of the combined outlet and diaphragm chamber 152 and carries a stem 157 which, upon downward movement, is adapted to engage valve 154 and move the same to open position. A spring 158 has one of its ends abutting diaphragm 156 and its other end abuts a spring retainer 159, the position of which is controlled by a plunger 160 which is pivoted to a lever 161 that in turn is pivoted to a bracket 162 carried by the pilot pressure regulator 145. The action of the spring 158 tends to open valve 154 and is opposed by spring 155 and by the pressure in diaphragm chamber 152. The force exerted by spring 158 is adjusted by moving lever 161 and this movement of lever 161 is automatically controlled by the motor mechanism 26 by means of a cable 163 having one of its ends secured to lever 161 and having its other end secured to pulley 32, it being noted that in Fig. 3 the cable 163 passes in back of pulley 32. A hollow nut 170 determines the minimum adjustment of spring 158.

With the parts in the position shown the outdoor temperature is moderate with the result that valve 154 is partially off its seat 153 allowing a small flow of steam to escape from diaphragm chamber 138 with the result that pressure regulator 136 allows an intermediate flow of steam into header 12. If the outdoor temperature should fall, it being remembered that pulley 32 is thereby rotated in a clockwise direction as viewed from the right, lever 161 will be moved downwardly to compress spring 158. Compression of spring 158 opens valve 154 more widely allowing a larger amount of steam to escape from diaphragm chamber 138 whereupon weight 137 will open the valve of pressure regulator 136 to a greater extent to permit a larger flow of steam to the radiators. In this manner, the pilot pressure regulator 145, through adjustment of spring 158 by motor mechanism 26, varies the pressure in diaphragm chamber 138 at the command of the control mechanism of Fig. 2 so as to control the flow of steam to the radiators in the same general manner as heretofore explained in connection with Fig. 1 and Fig. 2. The most notable difference between the system of Fig. 3 and the system of Fig. 1 is the manner in which the pressure regulators 11 and 136 are adjusted, the ultimate results obtained by these two systems being substantially identical.

Fig. 4 shows a further modification of the application of the invention wherein the motor mechanism 26 variably adjusts the tension of a spring 164 of an ordinary spring balanced diaphragm type pressure regulator suitable for use in connection with high steam pressures. The steam supply main is indicated at 10 and the header is indicated at 12. The operation of this type of ordinary spring balanced diaphragm pressure regulator, commonly known as the Mason regulator, is well known in the art and it is thought that in view of the previous descriptive matter, it will readily be understood that the pulley 32 of motor mechanism 26 variably positions lever 165 by means of a cable 166 to compress and expand the spring 164 in accordance with the various conditions set forth in connection with Figs. 1 and 2 in order to maintain the proper flow of steam to the radiators and space to be heated. A hollow nut 171 determines the minimum adjustment of spring 164.

From the foregoing description, it will be seen that the present invention provides an improved remote control system whereby an instrumentality such as the pulley 32 may be normally positioned in accordance with the movements of a movable member or the changes in one condition and may be further moved to some predetermined position as the result of the movements of another movable member or the changes in another condition or the instrumentality may be moved to a predetermined position during certain periods of time. It will further be apparent that the present invention provides improved means for controlling the flow of fluids and particularly the flow of steam to heating radiators and that the invention likewise includes novel means for automatically controlling the operation of various types of pressure regulators.

It will be readily understood that many changes and modifications can be readily made without departing from the spirit of this invention and I intend to be limited only in the purview of the appended claims.

I claim as my invention:

1. In combination, a fluid flow controlling element, means responsive to a physical condition associated therewith for operating the same to vary the fluid flow therethrough in accordance with the variations in said physical condition, and time operated means for additionally operating said fluid flow controlling element to maintain a predetermined minimum flow therethrough for a predetermined period of time irrespective of changes in the value of said physical condition.

2. In combination, a space the temperature of which is to be controlled, a fluid flow controlling element for controlling the supply of fluid by which the temperature of said space is controlled, temperature responsive means responsive to a temperature other than that of the space for operating said fluid flow controlling element to vary the flow of fluid therethrough in accordance with variations in the temperature to which said temperature responsive means responds, temperature responsive means responsive to the temperature of the space for additionally controlling said fluid flow controlling element to change the flow of fluid therethrough when the space temperature reaches a predetermined value, timing means for additionally controlling said fluid flow controlling element to reduce the flow of fluid therethrough, for predetermined periods of time, and thermostatic means responsive to the temperature of the space for automatically increasing the flow of fluid through said fluid flow controlling element if the space temperature reaches a predetermined value during that period of time during which the timing means normally reduces the flow of fluid.

3. In combination, a space the temperature of which is to be controlled, a fluid flow controlling element for controlling the supply of fluid by which the temperature of said space is controlled, temperature responsive means responsive to a temperature other than that of the space for operating said fluid flow controlling element to vary the flow of fluid therethrough in accordance with variations in the temperature to which said temperature responsive means responds, timing means for additionally controlling said fluid flow controlling element to reduce the flow of fluid therethrough for predetermined periods of time, and thermostatic means responsive to the temperature of the space for automatically increasing the flow of fluid through said fluid flow controlling element if the space temperature reaches a predetermined value during that period of time during which the timing means normally reduces the flow of fluid.

4. In combination, a space to be heated, valve means for controlling the flow of fluid by which the temperature of said space may be increased, thermostatic means responsive to a temperature other than that of the space to be heated and associated with said valve means for normally proportioning the flow of fluid through said valve means in accordance with variations in the temperature to which said thermostatic means responds, means responsive to the temperature of the space to be heated for operating said valve means to supply a maximum flow of fluid if the space temperature falls to a predetermined low value, and timing means for operating the valve means to supply a minimum flow of fluid during a predetermined portion of the night.

5. In combination, a space to be heated, valve means for controlling the flow of fluid by which the temperature of said space may be increased, thermostatic means responsive to a temperature other than that of the space to be heated and associated with said valve means for normally proportioning the flow of fluid through said valve means in accordance with variations in the temperature to which said thermostatic means responds, means responsive to the temperature of the space to be heated for operating said valve means to supply a maximum flow of fluid if the space temperature falls to a predetermined low value, timing means for operating the valve means to supply a minimum flow of fluid during a predetermined portion of the night, and additional thermostatic means responsive to the temperature of the space to be heated for operating said valve means to supply an intermediate flow of fluid if the temperature of the space falls below a predetermined low value lower than said first mentioned value while the timing means is operating to supply a minimum flow of fluid.

6. In combination, a space to be heated, valve means for controlling the flow of fluid by which the temperature of said space may be increased, thermostatic means responsive to a temperature other than that of the space to be heated and associated with said valve means for normally proportioning the flow of fluid through said valve means in accordance with variations in the temperature to which said thermostatic means responds, timing means for operating the valve means to supply a minimum flow of fluid during a predetermined portion of the night, and additional thermostatic means responsive to the temperature of the space to be heated for operating said valve means to supply an intermediate flow of fluid if the temperature of the space falls below a predetermined low value while the timing means is operating to supply a minimum flow of fluid.

7. In combination, switching mechanism, normally balanced electrically controlled means in control thereof, control resistance means associated with the normally balanced electrically controlled means, a movable member for operating said control resistance means to unbalance said normally balanced electrically controlled means, an electrically controlled device, balancing resistance means operated thereby and associated with the normally balanced electrically controlled means to rebalance the same when the electrically controlled device is energized, an energizing circuit for the electrically controlled device controlled by said switching mechanism, an instrumentality positioned by the electrically controlled device, and time operated means for additionally unbalancing said normally balanced electrically controlled means at predetermined times.

8. In combination, switching mechanism, normally balanced electrically controlled means in control thereof, control resistance means associated with the normally balanced electrically controlled means, a movable member for operating said control resistance means to unbalance said normally balanced electrically controlled means, an electrically controlled device, balancing resistance means operated thereby and associated with the normally balanced electrically controlled means to rebalance the same when the electrically controlled device is energized, an energizing circuit for the electrically controlled device controlled by said switching mechanism, an instrumentality positioned by the electrically controlled device, time operated means for additionally unbalancing said normally balanced electrically controlled means at predetermined times, and a second movable member for rendering said first movable member and timing means incapable of varying the balance of said normally balanced electrically controlled means when said second movable member reaches a predetermined position.

9. In combination, switching mechanism, normally balanced electrically controlled means in control thereof, control resistance means associated with the normally balanced electrically controlled means, a movable member for operating said control resistance means to unbalance said normally balanced electrically controlled means, an electrically controlled device, balancing resistance means operated thereby and associated with the normally balanced electrically controlled means to rebalance the same when the electrically controlled device is energized, an energizing circuit for the electrically controlled device controlled by said switching mechanism, an instrumentality positioned by the electrically controlled device and a second movable member for rendering said first movable member inoperative and for completely unbalancing said normally balanced electrically controlled means when said second movable member assumes a predetermined position.

10. In combination, a fluid flow controlling element in control of the flow of fluid by which a space is heated, outdoor temperature responsive means associated with said fluid flow controlling element operative to vary the flow of fluid therethrough according to changes in outdoor temperature, timing means operative additionally to control the flow controlling element to reduce the flow of fluid therethrough at predetermined times, and means responsive to the temperature of the space associated with the fluid flow controlling element and operative to change the flow therethrough if the space temperature reaches predetermined values either when the timing means is operating or not operating to reduce the flow of fluid through the fluid flow controlling element.

11. In combination, a fluid flow controlling element in control of the flow of fluid by which a space is heated, outdoor temperature responsive means associated with said fluid flow controlling element operative to vary the flow of fluid therethrough according to changes in outdoor temperature, timing means operative additionally to control the flow controlling element to reduce the flow of fluid therethrough at predetermined times, and means responsive to space temperature associated with the fluid flow controlling element and operative to control the same to increase the flow of fluid therethrough during one of said times if the space temperature falls to a predetermined value.

12. In combination, switching mechanism, normally balanced electrically controlled means in control thereof, control resistance means associated with the normally balanced electrically controlled means, a movable member for operating said control resistance means to unbalance said normally balanced electrically controlled means, an electrically controlled device, balancing resistance means operated thereby and associated with the normally balanced electrically controlled means to rebalance the same when the electrically controlled device is energized, an energizing circuit for the electrically controlled device controlled by said switching mechanism, an instrumentality positioned by the electrically controlled device, time operated means associated with said normally balanced electrically controlled means operative to render said movable member incapable of varying the balance thereof and to unbalance the electrically controlled means to a predetermined extent, and a second movable member operative to render said timing means and first movable member ineffective.

13. In an electrical system of control, in combination, electric motor means, an element which it is desired to variably position controlled by said electric motor means, an electrical controller responsive to a condition operable to progressively position said motor means as the condition to which said controller responds progressively changes, and control switching means operable to selectively place said motor means in any one of three definite positions irrespective of the value of the condition to which said controller responds.

14. In a control system, in combination, electric motor means in control of a condition changing device, a condition responsive controller in control of said motor means to determine the direction and extent of movement thereof to variably position the same, and control switching means in control of said motor means operable to move the same to any one of three definite positions irrespective of the condition of said controller.

JOHN TURNER.